United States Patent [19]
Dahl

[11] Patent Number: 5,287,613
[45] Date of Patent: Feb. 22, 1994

[54] METHOD OF MANUFACTURING AN ANNULAR SLIT RESTRICTOR USING A SHRINK FIT OPERATION

[75] Inventor: Eugene L. Dahl, Excelsior, Minn.

[73] Assignee: Professional Instruments Co., St. Louis Park, Minn.

[21] Appl. No.: 880,695

[22] Filed: May 8, 1992

[51] Int. Cl.$^5$ .............................................. B23P 11/02
[52] U.S. Cl. ........................................ 29/447; 285/381; 403/273; 138/42
[58] Field of Search ................ 29/447; 285/381; 403/273; 138/42

[56] References Cited
U.S. PATENT DOCUMENTS

| | | | |
|---|---|---|---|
| 4,466,462 | 8/1984 | Morris | 138/42 |
| 4,676,717 | 6/1987 | Willyard, Jr. et al. | 29/447 |

Primary Examiner—P. W. Echols
Assistant Examiner—David P. Bryant
Attorney, Agent, or Firm—Leo Gregory

[57] ABSTRACT

This device relates to a pneumatic control system and more particularly to an annular slit restrictor in connection therewith and a method for precisely centering an annular plug within an accurately formed annular hole in a flow control body in a shrink fit operation to cause the plug and hole to be co-axial.

1 Claim, 1 Drawing Sheet

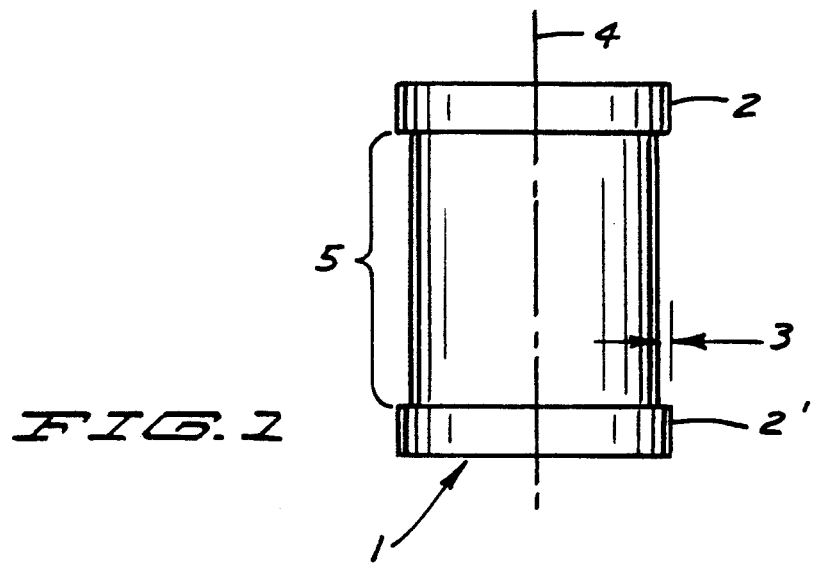
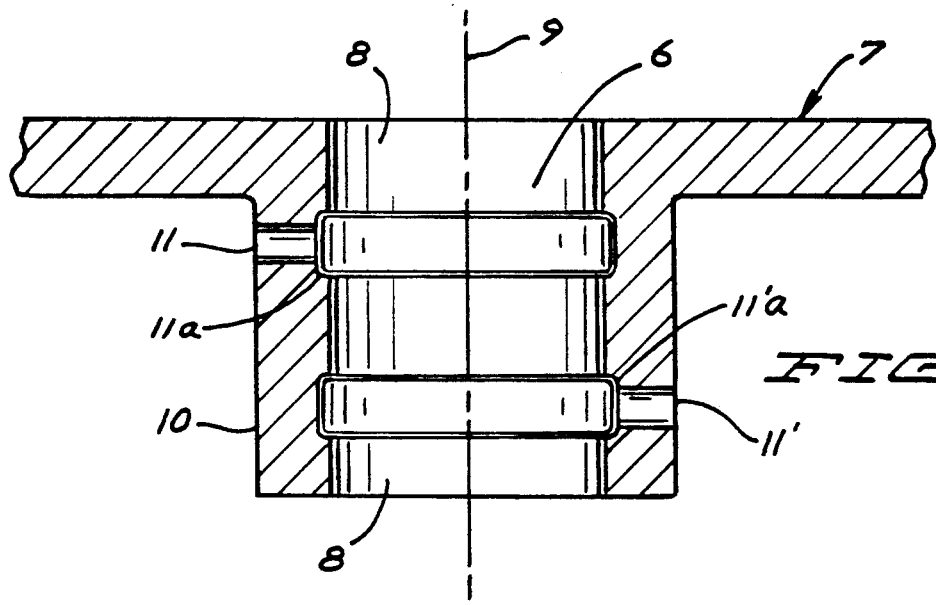
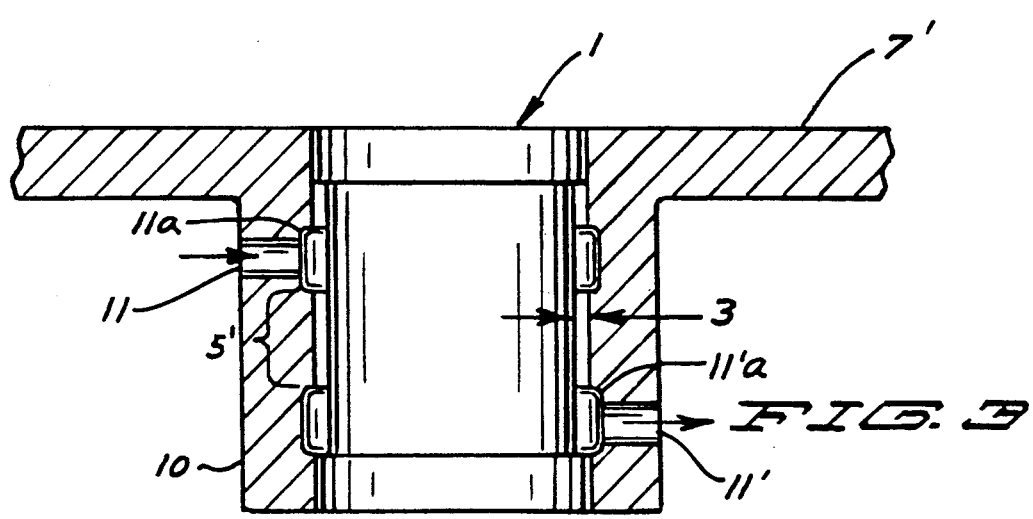

METHOD OF MANUFACTURING AN ANNULAR SLIT RESTRICTOR USING A SHRINK FIT OPERATION

BACKGROUND OF THE INVENTION

1. Field of Invention

This invention relates to annular slit restrictors in connection with pneumatic control systems.

2. Description of the Prior Art

A variety of different forms of fluid restrictors are used in fluid control systems. They are usually described as turbulent or laminar. The invention herein relates to laminar flow restrictors. Laminar flow restrictors are used when it is desired to have the flow coefficient proportional to the pressure differential across the restrictor over the whole range of useful pressure differentials.

Capillary tubes, flat or planar slits and annular slits are generally considered to be in the class of laminar restrictors. Annular slits remain laminar over a much larger pressure differential across the restrictors than capillary tubes do.

In summary, annular slit restrictors are the preferred form of a laminar restrictor. However the flow coefficient of an annular restrictor can vary by a factor of 2.4 due to the eccentricity of the central annular plug with respect to the defining annular hole. Further, the flow coefficient varies with the cube of the clearance within the annular slit.

The manufacture of precisely centered annular plugs of precise radial differences with respect to the annular hole has been so expensive that precise annular restrictors have been used sparingly in the past.

It is therefore a primary object of this invention to provide a novel means of making precisely centered annular plugs which are then inserted into defining annular holes and thereby produce precise annular slit restrictors.

It is desirable to have precisely centered annular slit restrictors with precisely controlled annular slit clearances that do not require machining capabilities that are better than are commercially available.

SUMMARY OF THE INVENTION

This invention relates to a novel method of manufacturing and assembling precisely centered annular slit structures.

The invention comprises an annular plug which is stiff in the bending mode having an appropriate length to diameter ratio and having an annular recessed surface region which is concentric or co-axial with the radial projection of the side walls of said plug, the same being machined in the same chucking.

BRIEF DESCRIPTION OF THE DRAWINGS

FIG. 1 is a front elevational view of an annular plug;

FIG. 2 is a broken view in vertical section of a flow control body having an annular hole and an inlet and outlet port; and FIG. 3 is a view similar to that of FIG. 2 showing the annular plug of FIG. 1 disposed into the annular hole of the FIG. 2 structure.

DESCRIPTION OF A PREFERRED EMBODIMENT

Referring to the Figures and particularly to FIGS. 1-3, a precisely made annular plug 1 is shown and the same is considered to be in a desirably stiff bending mode upon having a length to diameter ratio on the order of not more than 4:1 and found to be a good working dimensional ratio is one on the order of 2:1.

Said plug which is analogous to a spool has well defined regions comprising a pair of projecting end walls 2 and 2' and an annular recessed surface 5 therebetween referred to herein as the slit region or slit clearance having a depth as at 3.

With modern machine spindles, said end walls 2 and 2' can be machined readily to be within one tenth of a micrometer concentric with the annular surface region 5 therebetween.

In addition, with modern feed capabilities, the recessed distance or radial difference between the diameter of the projected ends and the annular slit region can be made to be to the same level of accuracy at each end of the plug. Thus said projected end walls of said plug and said annular surface 5 are co-axial.

Referring to FIGS. 2 and 3, a flow control body 7 is shown in broken vertical section having a planar top wall 7' and a depending cylindrical body portion comprising an annular wall 10 having formed therein an annular hole 6. Said hole is machined with the same degree of geometric accuracy as said plug 1 but having a slightly smaller diameter than that of the end walls 2 and 2'. Said body as here shown has unrestricted inlet and outlet ports 11 and 11'.

It is desired to insert said annular plug into said annular hole 6. Referring to FIG. 3, said plug 1 is shown to be inserted into the hole 6 and the radius of the annular slit clearance thereabout is indicated at 3. To accomplish this insertion, the flow control body 7 is heated. Heating expands the body. Heating said flow control body to a sufficiently high degree of temperature will increase the size of the flow control body and said annular hole therein to the extent that said annular plug is readily inserted into said hole. That having been done, said plug becomes warmed towards the temperature of the flow control body. Thus the annular plug expands to obtain a heat shrink fit as the plug warms up and as the plug and flow control body cool.

At this point in time, the contact regions 8 of the defining annular hole 6 with the annular plug end walls 2 and 2' define a precise axis 4 of said plug and a precise and identical axis 9 of said hole 6 to whatever level the plug and said hole were machined.

The heat shrink of the annular plug 1 and the defining hole 6 in the flow control body 7 may be maintained over a large range of temperature. If the flow control body and the annular plug are made of the same material, the shrink fit may be maintained over all temperatures. Consequently the flow control body may be tuned by selecting different downstream restrictors as each plug is inserted into the flow control body under test conditions.

It is noted here that the annular plug and flow control body may be made of various materials such as ceramic, steel and aluminum among others of a variety of suitable materials. The heating temperature is known in the art with respect to specific materials. It is preferable that the annular plug and the flow control body be formed of the same material.

If the wall 10 of said flow control body which defines the hole 6 is sufficiently thin, then the annular slit or clearance is precisely controlled by the radial difference 3 between the ends of the annular plug 1 and the annular slit surface 5 of said plug.

If the wall 10 of said flow control body is thicker, then the annular slit or clearance 3 can be predicted by calculating the elastic deformation of the flow control body and of the annular plug in order to maintain a given tolerance on the annular slit clearance.

The above is a description of means to obtain a precisely centered annular slit region with a precisely controlled slit clearance. It is to be understood that the above may be applied to various modifications illustrating a number of arrangements for the application of slit restrictors in flow control devices.

As has been indicated, the device herein relates to a pneumatic flow control system to perform analog functions. Shown are the essential control elements of an annular plug and a defining hole to provide with extreme accuracy a slit restriction clearance which is concentric or co-axial with said plug and said defining hole.

The control exercised by the described structure is the restriction placed on the fluid passing through the restricted clearance 5' which extends between said ports as said fluid passes from the inlet port 11 through the outlet port 11'.

For a uniform disbursement of fluid from the inlet port into the restricted slit clearance 5' and from said slit clearance to the outlet port 11', unrestricted annular grooves 11a and 11'a are provided in said flow control body communicating with the inner ends of said ports adjacent said slit clearance area.

It will of course be understood that various changes may be made in form, details, arrangement and proportions of the apparatus and in the steps and sequence of steps of the method herein without departing from the scope of the invention herein which generally stated consists in an apparatus and method capable of carrying out the object of the invention as disclosed and defined in the appended claims.

What is claimed is:

1. A method of manufacturing an annular slit restrictor comprising:

forming to predetermined accurate radial dimensions an annular plug having radially projecting spaced end walls forming a recessed annular surface therebetween, forming to a predetermined accurate lesser radial dimension than that of said end walls, an annular hole in a flow control body, said flow control body including an inlet port and an outlet port, heating said flow control body to increase the radial of the annular hole such that said plug is insertable therein, inserting said annular plug into said radially increased annular hole, and allowing said flow control body to cool, thereby forming a shrink fit between said annular plug and said annular hole, where said spaced end walls and adjacent wall surfaces of said annular hole form contact regions which maintain said annular plug and said annular hole in coaxial alignment, said recessed annular surface between said contact region forms a concentric annular slit passage, said inlet port extends from the outer surface of said flow control body into said slit passage, and said output port extends from said slit passage to the outer surface of said control body.

* * * * *